(12) United States Patent
Karg et al.

(10) Patent No.: US 12,400,110 B2
(45) Date of Patent: Aug. 26, 2025

(54) KNOWLEDGE TRANSFER BETWEEN DIFFERENT DEEP LEARNING ARCHITECTURES

(71) Applicant: Conti Temic microelectronic GmbH, Nuremberg (DE)

(72) Inventors: Michelle Karg, Lindau (DE); Christian Scharfenberger, Lindau (DE)

(73) Assignee: Conti Temic Microelectronic GmbH, Nuremberg (DE)

(*) Notice: Subject to any disclaimer, the term of this patent is extended or adjusted under 35 U.S.C. 154(b) by 818 days.

(21) Appl. No.: 16/613,212

(22) PCT Filed: Jun. 28, 2018

(86) PCT No.: PCT/DE2018/200065
§ 371 (c)(1),
(2) Date: Nov. 13, 2019

(87) PCT Pub. No.: WO2019/001649
PCT Pub. Date: Jan. 3, 2019

(65) Prior Publication Data
US 2021/0056388 A1    Feb. 25, 2021

(30) Foreign Application Priority Data

Jun. 30, 2017   (DE) .................. 10 2017 211 199.2
Aug. 1, 2017    (DE) .................. 10 2017 213 247.7

(51) Int. Cl.
*G06N 3/08* (2023.01)
*G06F 18/214* (2023.01)
(Continued)

(52) U.S. Cl.
CPC ............. *G06N 3/08* (2013.01); *G06F 18/214* (2023.01); *G06N 3/045* (2023.01); *G06N 3/063* (2013.01); *G06N 3/082* (2013.01)

(58) Field of Classification Search
None
See application file for complete search history.

(56) References Cited

U.S. PATENT DOCUMENTS 9,235,799 B2     1/2016  Yu et al.
2007/0203616 A1  8/2007  Borrmann et al.
(Continued)

FOREIGN PATENT DOCUMENTS

CN    103049792 A    4/2013
CN    106203506 A    12/2016
(Continued)

OTHER PUBLICATIONS

Yu, Scalpel_Customizing_DNN_pruning_to_the_underlying_hardware_parallelism, Jun. 24, 2017 (Year: 2017).*
(Continued)

*Primary Examiner* — Kakali Chaki
*Assistant Examiner* — Michael H Hoang
(74) *Attorney, Agent, or Firm* — Buchanan Ingersoll & Rooney PC

(57) ABSTRACT

The invention relates to a method for converting a first neural network with a first architecture into a second neural network with a second architecture for use in a vehicle controller in order to obtain the knowledge of the first neural network and transfer same to the second neural network. In a first step of the method, a conversion (701) of at least one layer of the first neural network into at least one layer of the second neural network is carried out. In a second step, a random initialization (702) of the at least one converted layer is carried out in the architecture of the second neural network. In a third step, a training process (703) of the at least one converted layer is carried out in the second neural network. In a fourth step, a fine-tuning process (704) of the non-converted layer is carried out in the second neural
(Continued)

network or in the entire second neural network. The conversion of the first neural network into the second neural network is carried out in multiple cycles or iterations, wherein for each cycle, the conversion (701), random initialization (702), training (703), and simultaneous fine-tuning (704) steps are carried out.

13 Claims, 4 Drawing Sheets

(51) Int. Cl.
　　*G06N 3/045*　　(2023.01)
　　*G06N 3/063*　　(2023.01)
　　*G06N 3/082*　　(2023.01)

(56) References Cited

U.S. PATENT DOCUMENTS

| | | | | |
|---|---|---|---|---|
| 2015/0006444 | A1* | 1/2015 | Tamatsu | G06N 3/082 706/12 |
| 2016/0217369 | A1* | 7/2016 | Annapureddy | G06N 3/082 |
| 2016/0307069 | A1 | 10/2016 | Wu | |
| 2017/0132528 | A1* | 5/2017 | Aslan | G06N 20/00 |
| 2018/0114110 | A1* | 4/2018 | Han | G06N 3/063 |
| 2018/0365564 | A1* | 12/2018 | Huang | G06N 3/045 |

FOREIGN PATENT DOCUMENTS

| | | |
|---|---|---|
| CN | 106322656 A | 1/2017 |
| CN | 106355248 A | 1/2017 |
| DE | 102004030782 | 1/2006 |
| WO | WO-2016130719 A2 * 8/2016 ............ B60W 30/10 |

OTHER PUBLICATIONS

Kim, Design and Implementation of the Vehicular Camera System Using Deep Neural Network Compression: Deep Learning for Mobile Systems and Applications, ACM, EMDL, Jun. 23, 2017, p. 25-30 (Year: 2017).*
Gupta, Transfer Learning and the art of using pre trained models in deep learning, blog at analyticavidhya.com Jun. 1, 2017 (Year: 2017).*
Abbasi-Asl Structural Compression of Convolutional Neural Network Based on Greedy Filter Pruning arXiv, May 2017 (Year: 2017).*
Sun et al., (hereinafter Sun), "Sparsifying Neural Network Connections for Face recognition", arXiv, 2015 (Year: 2015).*
Yosinski, Jason, et al. "How transferable are features in deep neural networks ?." Advances in neural information processing systems 27 (2014). https://proceedings.neurips.cc/paper_files/paper/2014/file/375c71349b295fbe2dcdca9206f20a06-Paper.pdf (Year: 2014).*
PCT English translation of the International Search Report of the International Searching Authority for International Application PCT/DE2018/200065, mailed Oct. 26, 2018, 3 pages, European Patent Office, HV Rijswijk, Netherlands.
PCT International Preliminary Report on Patentability including English Translation of PCT Written Opinion of the International Searching Authority for International Application PCT/DE2018/200065, issued Dec. 31, 2019, 9 pages, International Bureau of WIPO, Geneva, Switzerland.
German Search Report for German Patent Application No. 10 2017 213 247.7, dated Feb. 12, 2018, 9 pages, German Patent and Trademark Office, Muenchen, Germany, with partial English translation, 5 pages.
Beomjun Kim et al., "Design and Implementation of the Vehicular Camera System Using Deep Neural Network Compression", Deep Learning for Mobile Systems and Applications, ACM, EMDL '17, Jun. 23, 2017, XP058369871, ISBN: 978-1-4503-4962-8, pp. 25 to 30.
Pavlo Molchanov et al., "Pruning Convolutional Neural Networks for Resource Efficient Transfer Learning", Nov. 19, 2016, XP080733279, revised and published as "Pruning Convolutional Neural Networks for Resource Efficient Inference" Arxiv.org, arXiv: 1611. 06440v2 [cs.LG] Jun. 8, 2017, pp. 1 to 17.
Philipp Gysel et al ., "Hardware-Oriented Approximation of Convolutional Neural Networks", In: Computing Research Repository (CoRR) , Oct. 20, 2016, XP055398866, retrieved from the internet: https://arxiv.org/abs/1604.03168v3, retrieved on Feb. 12, 2018, pp. 1 to 8.
Jiecao Yu et al., "Scalpel: Customizing DNN Pruning to the Underlying Hardware Parallelism", Proceedings of the 44th Annual International Symposium on Computer Architecture (ISCA '17) , Jun. 24, 2017, XP058369127, ISBN: 978-1-4503-4892-8, pp. 548 to 560.
Greg Chu, "How to Use Transfer Learning and Fine-Tuning in Keras and Tensorflow to Build an Image Recognition System and Classify (Almost) Any Object", May 1, 2017, https://deeplearningsandbox. com/how-to-use-transfer-learning-and-fine-tuning-in-keras-and-tensorflow-to-build-an-image-recognition-94b0b02444f2, retrieved on Feb. 16, 2018, 12 pages.
Dishashree Gupta, "Transfer Learning & the Art of Using Pre-Trained Models in Deep Learning", Jun. 1, 2017, https://www.analyticsvidhya. com/blog/2017/06/transfer-learning-the-art-of-fine-tuning-a-pre-trained-model, retrieved on Feb. 16, 2018, 20 pages.
Zhang Zhen, "Full Sky Cloud Image Classification Method and Research Based on Deep Learning, China Merit Master Dissertation, Full Text Database Information Technology Collection" with translation, 2017, 12 pages.
Chinese Office Action for Chinese Application No. 201880043324.X, dated Feb. 22, 2023 with translation, 15 pages.
Chinese Office Action for Chinese Application No. 201880043324.X, dated Aug. 19, 2023 with translation, 29 pages.

\* cited by examiner

KNOWLEDGE TRANSFER BETWEEN DIFFERENT DEEP LEARNING ARCHITECTURES

The invention relates to a method for converting a first neural network into a second neural network. The invention additionally relates to a controller for performing said conversion, a vehicle having the controller, a program element and a computer-readable medium.

In current automobiles, camera-based driver assistance systems make an important contribution to increasing safety in road traffic. The aim of said systems is the robust recognition and classification of objects, lanes and surroundings scenarios. In this connection, computer vision and machine learning architectures, which are based on deep learning principles, make a significant contribution to the robust recognition of features and objects. In the past, very effective and powerful neural networks, such as e.g. ResNet, which feature high object recognition rates, have been developed precisely to improve the object recognition. Said neural networks have a great depth, and are trained with large datasets having millions of data. The process of training the large, but also smaller and flat networks, with the aid of a very large quantity of data is very computation-intensive and time-consuming, and can take as long as several weeks or months. Unfortunately, it is precisely in the cost-sensitive field of automobile applications, with its sensor platforms and embedded systems, that the hardware and runtime resources required to implement object recognition based on deep deep learning approaches and pre-trained neural networks are only available to a limited extent. The low availability of resources therefore requires the utilization of small and efficient neural networks with a corresponding architecture, which are not only flatter in terms of their depth than large, pre-trained networks, but which differ from these, particularly in their architecture such as e.g. the number of filters, layers or inceptions. This makes a simple adoption and application of large neural networks to resource-poor controllers as well as an efficient and simple subsequent training and fine-tuning of the neural network to be adopted difficult to impossible.

The process of training the large, but also smaller and flat neural networks, with the aid of a very large quantity of data is very computation-intensive and time-consuming, and can take as long as several weeks or months. For this reason, pre-trained networks with different architectures are made available, the parameters of which can be optimized, refined or respectively subsequently trained for a respective application with the aid of a smaller dataset. This is also referred to as fine-tuning.

One object of the invention is to be able to commission neural networks more quickly and more simply.

This object is achieved by the subject-matter of the independent claims. Embodiments and further developments are to be inferred from the dependent claims, the description and the figures.

A first aspect of the invention relates to a method for converting a first neural network with a first architecture into a second neural network with a second architecture for use in a vehicle controller in order to obtain the knowledge of the first neural network and transfer same to the second neural network. The method has the following steps:

Conversion of at least one layer of the first neural network, e.g. of a driver assistance system, into at least one layer of the second neural network, e.g. of the driver assistance system;

Adoption of the remaining layers of the first neural network in the second neural network, wherein this step is optional;

Random initialization of the at least one converted layer in the architecture of the second neural network;

Training of the at least one converted layer in the second neural network and simultaneous fine-tuning of the non-converted layer in the second neural network or of the entire second neural network.

Iterative repetition of the method until a second neural network has been completely produced, particularly until the criteria of robustness, computer speed, memory requirements, and/or recognition accuracy are satisfactorily met.

The method described above and below provides that the first neural network is converted into the second neural network in multiple cycles or iterations, that is to say gradually or iteratively, wherein for each cycle, the conversion, random initialization, training, and fine-tuning steps are carried out.

The invention relates to a method for transforming or respectively converting a first, deep learning-based neural network into a second, deep learning-based neural network, with the aim of obtaining the knowledge of the first neural network and transferring same to the second neural network. In this connection, the two neural networks can have different architectures, also called network architectures. In other words, the individual layers of the first neural network can be converted into layers of the second neural network. As a result, the fine-tuning method can be applied in a manner which is both inexpensive and favorable in terms of resources for the second neural network which has a different architecture to the first neural network. The converted layers and the layers adopted from the first neural network can be subsequently trained by means of a significantly smaller dataset and can be subjected to fine-tuning.

The second neural network is particularly provided for use in a vehicle or on a controller of a vehicle. Alternatively or in addition, the first neural network can also already be provided for use in a vehicle or on a particular controller of a vehicle. A first neural network can additionally be converted into multiple second neural networks, for example since the controllers (target hardware for the second neural network) have different hardware architectures. In this case, the multiple second neural networks can each have different second architectures which can each be dependent on the hardware.

It should be noted that the knowledge of the first neural network can be transferred into the second neural network by the method described above and below, even if the second neural network has a different architecture to the first neural network. Consequently, the knowledge of the first neural network can be retained.

The construction of a neural network is referred to as the architecture or respectively network architecture, that is to say how many different layers the neural network has and how the individual layers are configured. The weights and filters of the individual layers can additionally influence the architecture. In this connection, at least one layer of the first neural network can be converted into at least one layer of the second neural network. The converted layer of the second neural network can subsequently be randomly initialized. In other words, the weights and filters can be occupied by random values. The remaining, that is to say the non-converted, layers of the first neural network can be adopted without changes in the second neural network. The converted layer can be subsequently trained in the second neural network and the remaining, non-converted layers can be subjected to fine-tuning in the second neural network. The fine-tuning and the subsequent training process can take place simultaneously, that is to say in one step of the method. However, it is also conceivable that the fine-tuning and the subsequent training process are performed in separate steps. The dataset for the two steps, subsequent training and fine-tuning, can be the same. However, different datasets can also be utilized for the two steps. In this way, the first architecture can be iteratively converted into the second architecture up to the final architecture. It should be noted that, in each cycle or respectively in each iteration, other layers of the first neural network can be converted into layers of the second neural network. As a result, the knowledge trained on the basis of very large datasets and coded in the first neural network can be transferred into the second, new and/or altered neural network or respectively the knowledge can be obtained up to the final architecture. Consequently, the intensive retraining of the second neural (or respectively of the nth) network with a plurality of data can be reduced. Following the conversion of the first neural network into the second (or respectively nth) neural network, the fine-tuning can be performed with a small dataset. The knowledge acquired in the field, e.g. by journeys on the road, can additionally be transferred to a second (new) neural network which can have a new second (or respectively nth) architecture. Thanks to the conversion of already existing neural networks (first neural network) into a second (or respectively nth) neural network, the fine-tuning method can continue to be effectively deployed, i.e. the fine-tuning leads to the desired result with a small dataset. This avoids, on the one hand, the long process of retraining the second (or respectively nth) neural network and, on the other hand, the very costly process of creating new training and test data. Said data typically have to be manually processed and edited. The knowledge learnt by rare scenarios is also retained in the second (or respectively nth) neural network. This can be particularly advantageous if the training dataset does not or respectively cannot reproduce these results. The fine-tuning can, in this connection, be performed with the same dataset or a new dataset. The fine-tuning particularly serves to adjust the different architectures of the two neural networks, as a result of which no new dataset has to be created, but the dataset of the first neural network can be utilized. In other words, the second neural network can be optimized for the second architecture by the fine-tuning. Thanks to the conversion, considerable training time can additionally be saved, compared with a retraining process, since the individual layers no longer have to be completely retrained, rather targeted adjustments and a fine-tuning process take place. These steps, which are executed iteratively, can additionally be performed with smaller datasets compared with a retraining process. Thanks to the utilization of the method described above and below, a second (or respectively nth) neural network can be produced, which has a high quality of object recognition.

In an exemplary embodiment, both neural networks, the first and the second (or respectively nth) networks, are embodied to carry out object recognition, for example, in order to recognize road users (vehicles, pedestrians and cyclists), road markings, road signs or construction site markings from image data of a camera or from radar or lidar data.

Furthermore, in the event of a hardware or architecture-related switch e.g. of the sensor, the "old" first neural network can also be converted into the "new" second (or respectively nth) neural network. Consequently, an exchange of the sensors from one product generation to a new product generation is facilitated. This can additionally increase the flexibility since new hardware can be integrated into existing systems more quickly, particularly in the event of a computing unit being switched or in the event of a switch to a more powerful chip.

In order to compete on the market, it is essential to be an "Easy Application". Thanks to the method described above and below, it is possible to respond quickly to customer wishes, and adjustments in the field of deep learning can be easily made. The method described above and below additionally makes it possible to convert very powerful and complex first neural networks and corresponding architectures into less complex, but efficient second (or respectively nth) neural networks for application on a controller. This is particularly important if the computing capacity of the hardware, e.g. on a controller of a driver assistance system, is restricted.

The individual steps of the method can be executed at the same time or sequentially. A larger period of time can additionally exist between the individual steps of the method. The sequence of the individual steps can also be altered.

The method described above and below can be applied to a plurality of different neural networks which are utilized to recognize objects, such as e.g. long-term short-term memory networks (LSMN/LSTM) and/or recurrent neural networks (RNN). Furthermore, the method can be applied in continual, life-long and award-based deep learning methods. These include architectures and methods which are based, for example, on reinforcement learning techniques. In order to better extract features, a neural network having a feedback loop or parallel path can also be applied. The described neural networks can additionally be expanded to cover the object detection methods which utilize spatial and temporal data, such as e.g. videos and/or images, which contain spatial information such as the optical flow, disparity maps or depth maps. It should be noted that the method described above and below is also suitable for neural networks which are used for voice recognition, pattern recognition, prediction, character recognition, optimization, engine control, time series analysis or encryption, which are also increasingly found in vehicle surroundings.

The method can be applied, independently of data, in all architectures. This also applies to signal processing from applications having input data such as thermal images, ultrasound images, magnetic resonance signals, near-infrared spectroscopy and/or computer-assisted tomography, but also audio, radar, laser and lidar data. Furthermore, the method can be utilized in robotics for machine vision and particularly for Advanced Driver Assistance Systems (ADAS).

The individual different strata or respectively tiers of the neural network are referred to as layers. Therefore, within the context of the present invention, the term "layer" is utilized synonymously with the term "stratum" or respectively "tier". A neural network typically has at least one layer. However, it is usual for a neural network to have a plurality of different layers of different complexity. The selection of the layer to be converted can be made on the basis of hardware underlying the calculation such as, for example, the sensor. The architecture of the second neural network can be deduced from this. Thus, a smaller neural network having a lower number of layers and filters can be used, for example, for a smaller controller of a vehicle having low computational power, so that the architecture of the second neural network is optimized for the hardware of the controller.

The term "training" denotes the targeted supply of the neural network with known input data. The result, that is to say the output of the neural network with respect to the known input data, can be restored to the neural network. Simultaneously, the solution for the specific problem posed can also be delivered. In other words, the neural network processes input data and compares these with the predefined nominal result. The neural network is thereupon adjusted until the desired result is produced by the neural network. A plurality of training data is required in order for a neural network to be able to reliably recognize and classify a plurality of different input data. Depending on the complexity of the neural network and the quantity of training data, the training process additionally requires a particular period of time and computational power.

The fine-tuning refers to the refining and subsequent training of a neural network with the aid of a small, more specific dataset, wherein the neural networks utilized in this connection have already been pre-trained. In the present case, the fine-tuning is particularly used to adjust to the second architecture of the second neural network. Consequently, the same dataset as that for the first neural network can be utilized. In other words, a better optimization for the target hardware can be carried out thanks to the fine-tuning.

To simplify the description, the term object recognition is generally utilized and refers to recognitions of any type such as, for example, lane recognition, object recognition, such as road users, road sign recognition, recognition of road markings, construction site recognition, recognition of gestures and/or face recognition.

A great deal of knowledge is typically trained in a large first neural network. However, this first neural network cannot necessarily be transferred to a new hardware structure or respectively hardware. The process of training a new neural network for the new hardware structure would additionally demand a lot of time. Furthermore, it may be that the training data of the first neural network is not available in the required form and quality for the new neural network. It follows from this that the new neural network tends to have a worse performance, compared with the first neural network. In order to solve the problem described above, the first neural network can be converted into a second neural network with the method described above and below, so that the knowledge and the training of the first neural network are retained, the training dataset can be smaller and the time for the training is considerably reduced.

EXAMPLE

A first neural network exists with the following first architecture (A_Basic):

An RGB image serves as an input variable.

The architecture (A_Basic) of the first neural network has 20 layers, each with more than 200 filters as well as 1×1 and 3×3 convolutions. Consequently, the first neural network has a total complexity of more than 50 GMAC (Giga Multiply Accumulate operations) and 50 million parameters.

However, the embedded system architecture of the target hardware only supports 2×2 convolutions; the input image for the embedded system is additionally located in another color space.

A) In order to save the computational effort for the conversion or respectively transformation of the input image into the RGB color space, the first n layers of the first neural network are converted and randomly initialized with the first architecture A_Basic, wherein the network with the architecture A is trained with images in the color space of the embedded system architecture. This step can be subdivided into multiple substeps, wherein the number of input layers, the number of filters and the type of layers are adjusted in order to produce an architecture of the second neural network which is optimized for the embedded system.

B) If the input layers of the neural network with the architecture A can be efficiently calculated on the embedded system, the intermediate strata of the first neural network are iteratively replaced by hardware-optimized strata (only 2×2 convolutions) in a next step (optimized for the hardware of the embedded system), re-initialized and subsequently trained. Consequently, the input and intermediate layers of the neural network are optimized with the architecture B for the hardware (the embedded system).

C) Finally, the output layers of the neural network with the architecture B are iteratively optimized for the hardware. The output layers are therefore iteratively replaced by hardware-optimized layers (only 2×2 convolutions), re-initialized and subsequently trained. The second neural network with the second architecture C then only consists of 2×2 convolutions, the number of filters per layer is optimized for operation on the embedded system and the total number of GMACs has been reduced to a suitable number for real-time operation, e.g. 1GMAC.

The second neural network with the architecture C shows the same performance as the first neural network with the architecture A_BASIC, however it differs in the type and number of layers, number of filters and type of input image.

In other words, individual or multiple layers of the first neural network with a first architecture can be gradually converted or respectively translated into a second neural network with a second architecture. In this connection, the layers of the second neural network can be optimized for the object to be solved (e.g. object or voice recognition) or for the hardware which runs the second neural network. Consequently, the performance of the first neural network can be retained, although the architecture of the two neural networks differs.

Further Example:

The first neural network serves to recognize objects in road traffic and has been trained accordingly. At the moment, the first neural network is run by a first controller in the vehicle. The first neural network has additionally been further refined during numerous test runs so that it recognizes more objects more reliably in real driving situations.

It was then decided to change the hardware of the controller, which clearly differs from the previously utilized hardware.

Thanks to the method described above and below, it is now possible to convert, to translate or to transform the first neural network and the knowledge contained in said network gradually into the second neural network. Consequently, a second neural network can be produced for the new hardware simply, quickly and in a resource-sparing manner. Consequently, the tedious and computation-intensive retraining process is dispensed with. The knowledge of the first neural network, which is collected over time, is additionally still available in the second neural network. In other words, it is possible to react to changes in the hardware quickly, without retraining and a loss of quality in the object recognition. A targeted optimization for the new hardware can additionally take place during the conversion, so that the second neural network can be run more efficiently and more reliably on the target hardware.

According to an embodiment of the invention, the conversion of the first neural network into the second neural network is carried out in multiple cycles, that is to say gradually or iteratively, of the method described above and below, wherein for each cycle, the conversion, random initialization, training, and fine-tuning steps are carried out.

In order to reduce the computational power, the method of converting a first neural network into a second neural network can be carried out gradually, that is to say in multiple cycles. In this connection, at least one layer of the first neural network can be converted into at least one layer of the second neural network in each step. Following the conversion of the at least one layer, the latter is randomly initialized. The layers of the first neural network, which are not converted in this cycle, can be adopted without changes in the second neural network. Following the random initialization of the converted layer, the latter can be subsequently trained in the second neural network. The layer of the second neural network, which has been adopted from the first neural network, can be simultaneously adjusted by the fine-tuning to the second neural network. As a result, a first generation of the second neural network can be formed.

The first generation of the second neural network can serve as a starting point in the next step. Based on this, the next, at least one layer of the first neural network (which has not previously been converted) can be converted into at least one layer of the second neural network. Here as well, a layer of the first neural network can be adopted without changes. Consequently, a neural network consisting of the layers converted in the first generation, the currently converted layer and the layers adopted from the first neural network is formed. The layer converted in the second cycle can also be randomly initialized. The randomly initialized layer can additionally be subsequently trained and a fine-tuning of the layer adopted from the first neural network can simultaneously be performed. The fine-tuning of the second generation can contain the layer converted in the first generation so that the fine-tuning is also applied during this. As a result, a second generation of the second neural network can be formed.

The steps can be performed until such time as all of the layers of the first neural network have been converted into layers of the second neural network. In other words, the method can provide multiple cycles, for example 3, 5, 20 but also in general n, wherein n is a natural number.

The gradual conversion is typically carried out, starting with the input layer, in the direction of the starting layer of the neural network. It is, however, also conceivable to start at the starting layer of the first neural network and to perform the method gradually up to the input layer.

A simultaneous conversion is additionally possible in addition to the gradual conversion. In other words, all of the layers to be converted of the first neural network are simultaneously converted into layers of the second neural network.

According to a further embodiment of the invention, the method additionally has the step of transferring at least one layer of the first neural network without changes into the second neural network.

The method can additionally provide that layers of the first neural network are also adopted without conversion in the second neural network. Consequently, the outlay during the conversion of the first neural network into the second neural network can be reduced and, as a result, computing time can be saved.

According to an embodiment of the invention, the conversion step comprises the conversion of at least two layers of the first neural network into a layer of the second neural network.

In each step of the conversion of the first neural network into the second neural network, multiple layers of the first neural network can be converted into one or more layers of the second neural network. For example, three layers of the first neural network can be combined into two layers of the second neural network. Consequently, the complexity of the second neural network can be reduced, compared with the first neural network. As a result, the second neural network can also be run on hardware having less computational power.

According to a further embodiment of the invention, the conversion step can comprise the conversion of a layer of the first neural network into at least two layers of the second neural network.

In addition to the combination of multiple layers of the first neural network, the method can also provide that one or more layers of the first neural network is/are converted into a plurality of layers of the second neural network. For example, two layers of the first neural network can be converted into five layers of the second neural network. As a result, specific focal points can be set in the second neural network so that the latter has a higher accuracy and/or reliability at specific points of the second neural network.

According to an embodiment of the invention, the conversion step can exclusively comprise the conversion of an input layer of the first neural network into the second neural network, wherein the method provides that the remaining layers of the first neural network are transferred without changes into the second neural network.

If a conversion of the first neural network into the second neural network is necessary due to a switch of the sensor hardware, e.g. due to another camera been used which has other physical parameters, such as e.g. the focal distance or color space, the method described above and below can provide that the input layer(s) is/are exclusively to be converted and the remaining neural network is to be adopted without changes. This is particularly advantageous in the case of new sensors, such as e.g. cameras, since in the event of, for example, a change being made to the imager or the optical module as a result of the change in the input information, such as e.g. the color, it is possible to not convert the entire network but only the input layer. For example, the "old" camera can deliver YUV images and the "new" camera produces RGB images. This can also be realized efficiently and inexpensively by exclusively converting the input layer. Furthermore, it should be noted that the input layer can, for its part, have multiple layers, for example the first five layers. Consequently, a controller having a neural network can be simply, quickly and inexpensively adjusted to new input variables. This can be particularly advantageous if, for example, the camera is replaced by a newer model in a vehicle.

According to an embodiment of the invention, the method provides that the second architecture of the second neural network is to be optimized or respectively to be compressed for hardware running said neural network.

In other words, the architecture of the second neural network can be selected such that said architecture is optimized for the hardware which subsequently runs the second neural network. For example, it can be provided that the second neural network is to run on an "embedded system" or a controller of a vehicle. In this case, the computational power of the "embedded system" or the controller can be restricted so that, thanks to an optimization of the architecture for the corresponding hardware, the second neural network can nevertheless be run. Thanks to the optimizing or respectively compressing of the second neural network, computation time or respectively power can consequently be reduced, without the quality of the second neural network decreasing. It should be noted that thanks to the method described above and below for converting a first neural network into a second neural network, the knowledge contained or respectively coded in the first neural network is translated into the second neural network. This also particularly happens if the architecture of the second neural network differs significantly from the architecture of the first neural network, or if the method optimizes or respectively compresses the architecture of the second neural network for the hardware running said neural network.

According to an embodiment of the invention, the method further has the following steps:

Extraction of a subnetwork from the first neural network;
Random initialization of the subnetwork in the architecture of the second neural network;
Training of the subnetwork in the architecture of the second neural network;
Utilization of the subnetwork as an independent neural network;
Iterative repetition of the conversion of the at least one layer of the first neural network, the random initialization, the training and the simultaneous fine-tuning.

In addition to the conversion of the first neural network into the second neural network, the method described above and below can also provide that a part of the second neural network is extracted as a subnetwork. The extracted subnetwork can, for example, be used on other hardware such as e.g. another controller. The second neural network can additionally be distributed to different controllers or respectively computer units, so that each of these multiple controllers has a part of the second neural network and can calculate. In other words, the second neural network can be divided into multiple subnetworks which can, in turn, be run on different computer units or respectively controllers.

Not only can the method described above and below be applied to the conversion of neural networks, but it can also be applied to graphical models such as e.g. Markov chains, hidden Markov models, Markov random fields, Boltzmann machines or conditional random fields.

For example, a first neural network for an image sensor, such as e.g. a camera, can be additionally converted by the described method into a second neural network for another type of sensor such as e.g. a radar sensor, an ultrasonic sensor, a lidar sensor or a laser scanner.

A further aspect of the invention relates to a controller for a vehicle for converting a first neural network into a second neural network. The controller has the first neural network with a first architecture and the second neural network with a second architecture. The first architecture and the second architecture are different from one another. The first neural network and the second neural network have at least one layer. The controller is additionally designed to gradually convert the first neural network into the second neural network, wherein the controller is embodied to convert at least one layer of the first neural network into at least one layer of the second neural network in each cycle of the gradual conversion. Furthermore, the controller is embodied to randomly initialize and train the at least one converted layer in the second neural network, as well as to subject the non-converted layer, individually selected layers or the entire second neural network to a fine-tuning process in each cycle.

The method described above and below can be executed by a controller of a driver assistance system. The controller can also be embodied to perform the conversion of the first neural network into the second neural network. The controller can also extract a part of the second neural network, a so-called offspring network, from the second neural network. This extracted subnetwork can subsequently be used on another controller and/or on the sensor such as e.g. the camera. It should also be noted that the conversion of the first neural network into the second neural network can also be run on another computing unit such as e.g. a server or PC, and the second neural network is subsequently transferred to the controller. For example, the input layer can be amended or respectively adjusted by the controller so that altered input data, such as color, can be adaptively considered, e.g. by a camera.

According to an embodiment of the invention, the controller is designed to process input data by means of the second neural network.

Neural networks are typically used to process data and, particularly, to recognize and classify objects. The second neural network produced by the method described above and below can also be provided for this purpose. To this end, the second neural network on a controller of a driver assistance system can recognize objects in input data, such as e.g. image data of the camera or radar data and classify these accordingly. The starting data produced by the second neural network can subsequently help the driver assistance system to perform its tasks.

According to a further embodiment of the invention, the controller is embodied to convert the first neural network of a first vehicle system into the second neural network of a second vehicle system.

The controller can be embodied to convert the first neural network, e.g. for image data, into the second neural network, e.g. for radar data. Consequently, an effective object recognition can also be implemented in the controller of the radar sensor.

A further aspect of this invention relates to a vehicle having a controller which is described above and below.

According to a further aspect, the invention relates to a driver assistance system having a controller which is described above and below.

The designation "vehicle" is not limited solely to a passenger car, but also includes trucks, buses, motorcycles, tractors, tanks, construction vehicles, rail vehicles, ships as well as aircraft such as helicopters or airplanes.

A further aspect of the invention relates to a program element which, if it is run on a controller of a driver assistance system, instructs the driver assistance system to execute the method described above and below.

A further aspect of this invention relates to a computer-readable medium, on which a program element is stored, which instructs the controller of a driver assistance system to execute the method described above and below.

Further features, advantages and possible applications of the invention are set out by the following description of the exemplary embodiments and the figures.

The figures are shown schematically and are not true to scale. If the same reference numerals are indicated in the following description of the figures, these designate the same or similar elements.

Figure 1:
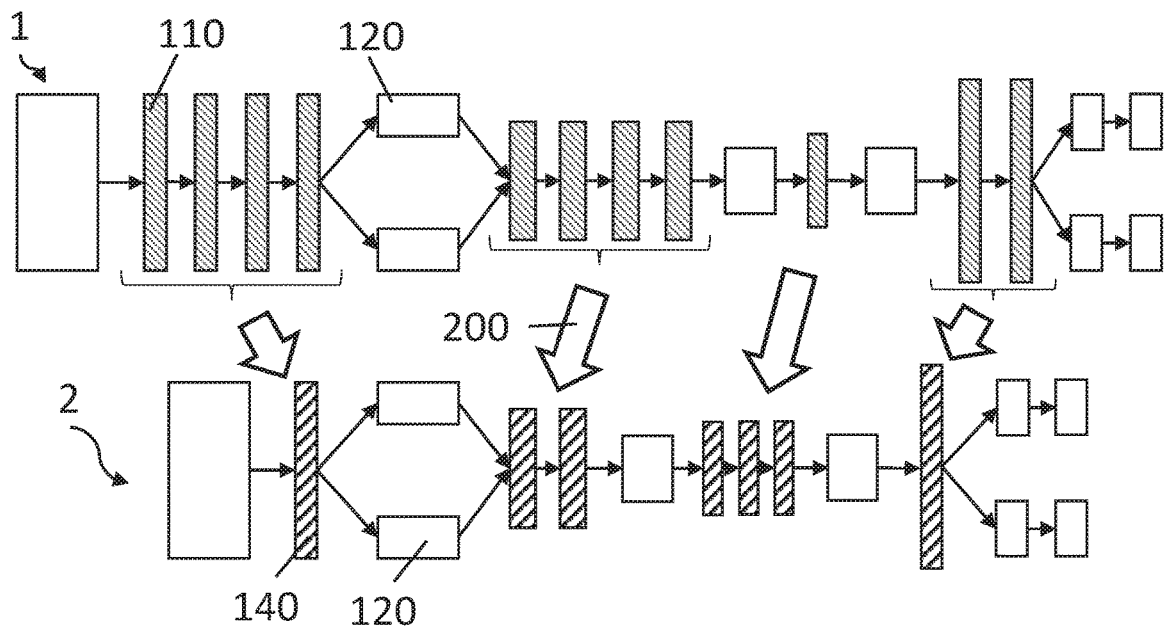
FIG. 1 shows the conversion of the first neural network into the second neural network according to an embodiment of the invention.

FIG. 1 shows an exemplary first neural network 1 with a first architecture which has been converted into the exemplary second neural network 2 with a second architecture. Both the first neural network 1, shown at the top in FIG. 1, that is to say the starting network, and the second neural network 2, shown at the bottom in FIG. 1, the target network, have a plurality of different layers 110, 120, 140. These layers 110, 120, 140 are symbolized by different boxes of different sizes. In this connection, the empty boxes 120, that is to say those which do not have any shading, symbolize layers which are translated without changes into the second neural network 2. The lightly shaded boxes 110 of the first neural network 1 symbolize layers which are converted from the first neural network 1 into the second neural network 2. In this connection, the conversion is carried out and includes the weights and the filters. The conversion of the individual layers to be converted 110 is symbolized by the blank arrows 200. Following the conversion, the layers are randomly initialized and trained in the second neural network 2. If this has happened, the converted layers 140 are symbolized by boxes 140 with heavy shading. Consequently, the second neural network 2 has been produced.

According to an embodiment of the invention, multiple layers to be converted can, in this connection, be converted into a single layer of the second neural network 2. A conversion of a single layer of the first neural network 1 into multiple layers of the second neural network 2 is additionally possible. Furthermore, every possibility therebetween of converting a first number of layers into any second number of layers in the second neural network 2 can also be converted. Consequently, another architecture, compared with the first neural network 1, emerges for the second neural network.

The advantage of the method for converting targeted layers from the first neural network 1 into the second neural network 2 is that no knowledge from the first neural network 1 is lost. The knowledge is coded in the layers 110, 120, of the first neural network 1, since the knowledge, among other things, has been collected during the operation of the first neural network 1. It should be indicated as a further advantage that the second neural network 2 can be trained with a significantly lower quantity of training data, without reducing the quality. Consequently, the expensive creation of training data is reduced and the training time is additionally reduced. This can be particularly useful if it becomes necessary to switch the neural networks due to a change in the hardware, e.g. the sensors, for the input data and/or due to a change in the hardware of the computing unit. Consequently, time and money can be saved thanks to the method shown in FIG. 1, compared with a process of retraining a neural network. The conversion of the first neural network 1 into the second neural network 2 can be performed in one step or in multiple cycles, as shown in FIGS. 2 to 4.

The conversion 200 is based on the principle that individual layers 110 of the first neural network 1 are gradually converted in each cycle and, following a random initialization, can be subsequently trained and refined in the remaining, still existing structure of the first neural network 1. The first neural network 1 can be a pre-trained neural network or an existing neural network of a previous product generation. Furthermore, the knowledge of the first neural network 1, which is coded in the weights and layers, is converted or respectively transferred into the second neural network 2. As a result, the knowledge regarding multiple product generations can be obtained. The second neural network 2 is particularly provided for use on a controller of a vehicle.

Figure 2:
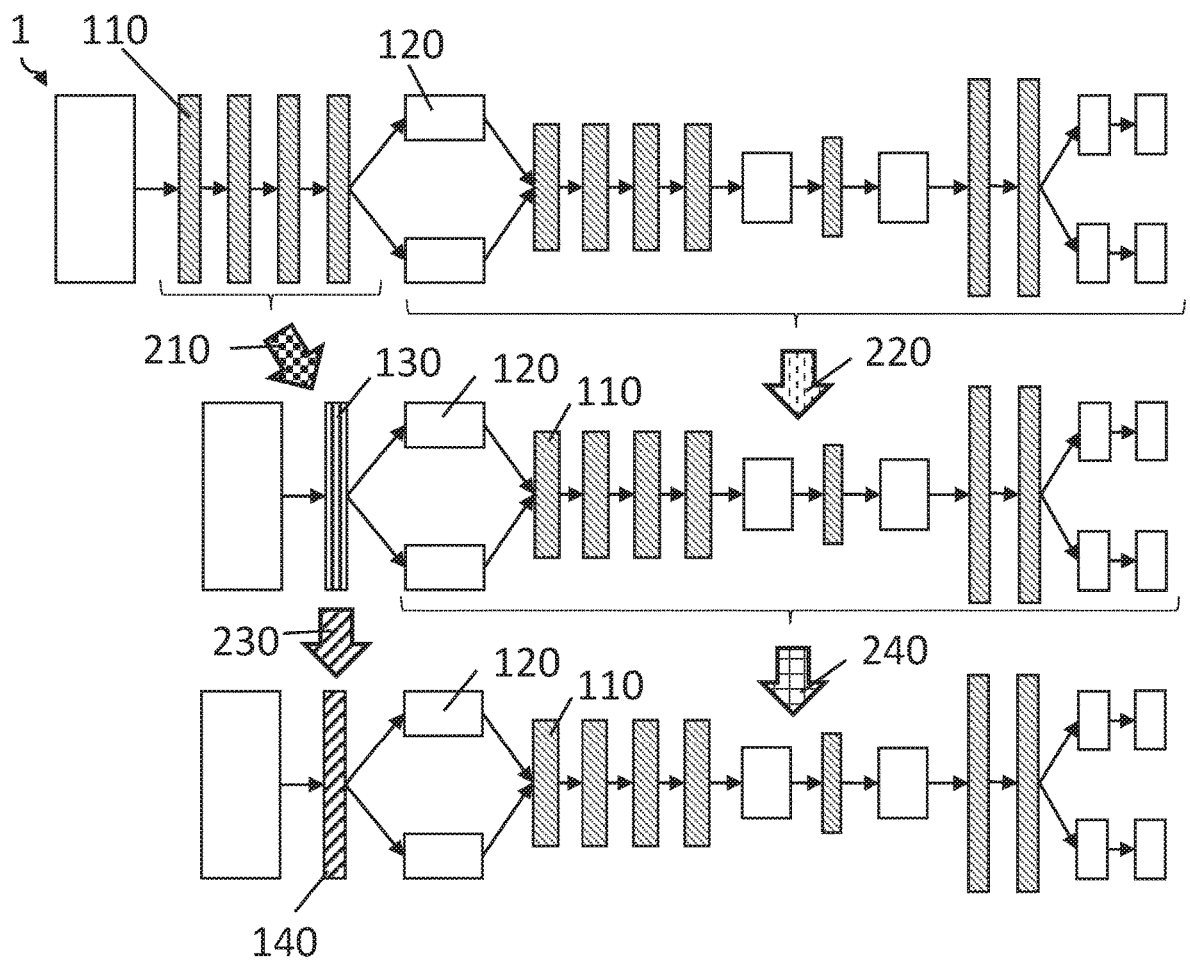
FIG. 2 shows a first cycle during the conversion of the first neural network into the second neural network according to an embodiment of the invention.
Figure 3:
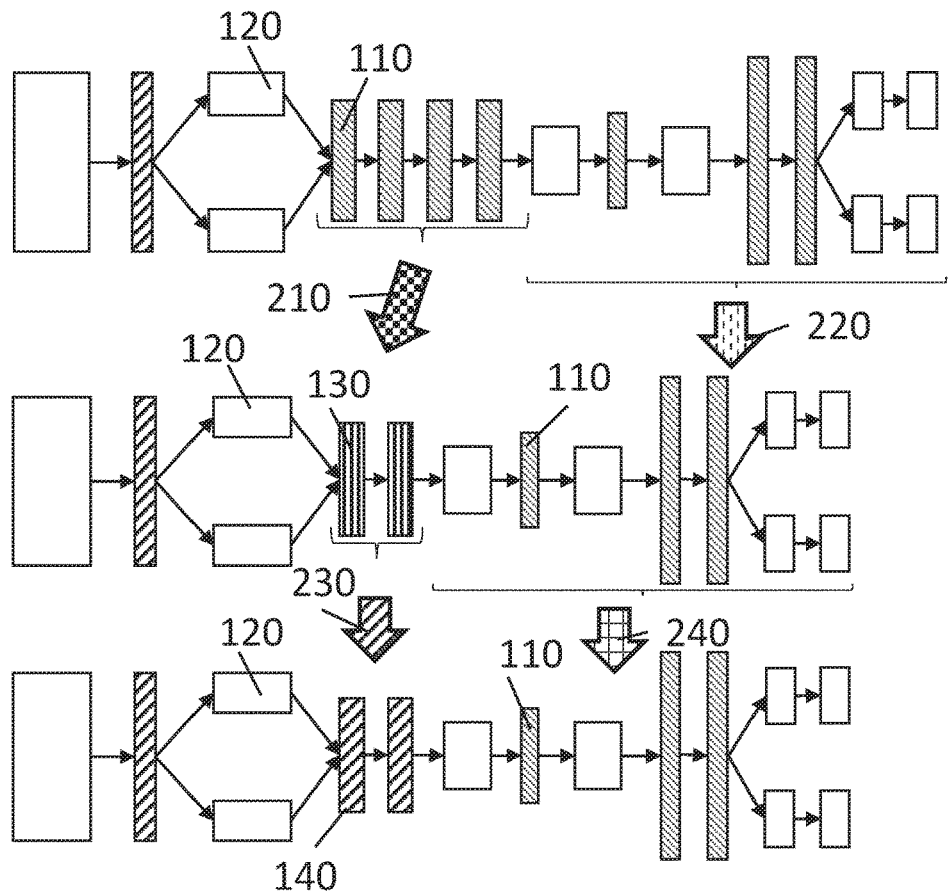
FIG. 3 shows a second cycle during the conversion of the first neural network into the second neural network according to an embodiment of the invention.
Figure 4:
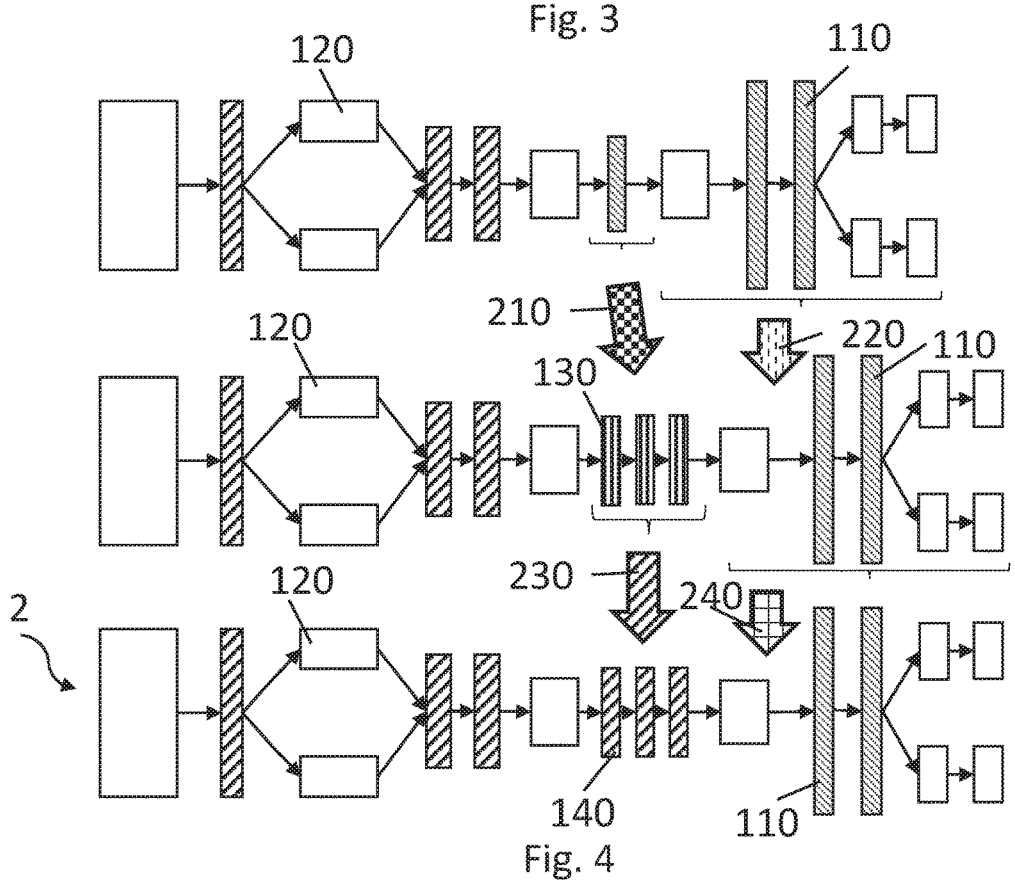
FIG. 4 shows a third cycle during the conversion of the first neural network into the second neural network according to an embodiment of the invention.

FIGS. 2 to 4 show a gradual conversion of the first neural network 1 into the second neural network 2. In this connection, FIG. 2 shows the first cycle for the first generation of the second neural network 2 during the conversion of the first neural network 1 into the second neural network 2. In a first step, the first layers to be converted 110 of the first neural network 1 are converted 210 into layers of the second neural network 2 with corresponding architecture. During the conversion 210, the converted layer is simultaneously randomly initialized. Consequently, a randomly initialized layer 130 is formed. The remaining neural network as well as the weights, filters and layers thereof are adopted 220, in an unaltered manner, from the first neural network 1 in the second neural network 2. In this connection, the adopted layers can also include layers which are converted in a later cycle of the conversion. Following a random initialization of the new layer 120, including the weights and filters thereof, the new layer is trained 220 in the second neural network 2. Consequently, the layer becomes a layer which is trained 140 in the second neural network. The adopted layers can simultaneously be adjusted with the aid of a small dataset and the fine-tuning method 240 to the second neural network. The dataset for the training and the fine-tuning can be the same, however different datasets can also be utilized. Following the conclusion of these steps, the first generation of the second neural network 2 is created.

FIG. 3 shows the second cycle for the second generation of the conversion of the first neural network 1 into the second neural network 2. To this end, the method described in FIG. 2 is applied to the next group of the layers to be converted 110, wherein the first generation of the second neural network 2 serves as the basis. Here as well, the following layers are adopted 220 directly in the second neural network 2. The layers 140 which have already been converted and trained in the first generation additionally remain unaltered. Following the random initialization 210 of the layers 130 converted in the second cycle as well as the weights and filters thereof, these layers are trained 230. Simultaneously, the second neural network 2 is adjusted with the aid of the same dataset which was utilized for the creation of the first generation, and the fine-tuning method 240. Following the conclusion of the training, the next generation of the second neural network 2 is created.

FIG. 4 shows the cycle following FIG. 3 for the third generation of the conversion of the first neural network 1 into the second neural network 2. Here as well, the next layers to be converted 110 of the first neural network 1 are converted 210 into layers of the second neural network 2, while the neural network originating from the previous generation and the weights, filters and layers thereof remain unaltered. In contrast to FIG. 2 and/or FIG. 3, the exemplary expansion of a layer of the first neural network 1 by two further layers in the second neural network 2 is represented. The layers which are converted as a result are also randomly initialized 210, so that randomly initialized layers 130 are formed. Subsequently, the randomly initialized layers 130 and the weights and filters thereof are trained 230 in the second neural network 2. The second neural network 2 is simultaneously adjusted with the aid of the same dataset which was utilized for the creation of the first and second generation, and the fine-tuning method 240. Following the conclusion of these steps, the next generation of the second neural network 2 is created.

The first neural network 1 can be converted into the second neural network 2 with the aid of the gradual method described. Following the conclusion of the conversion, the second neural network 2 can be refined with the aid of the fine-tuning method and further datasets for the desired scenario. The fine-tuning can be particularly used to meet the requirements of the second architecture. The converted neural network can subsequently be used on a controller of a driver assistance system, in order to recognize e.g. objects or voice commands.

Figure 5:
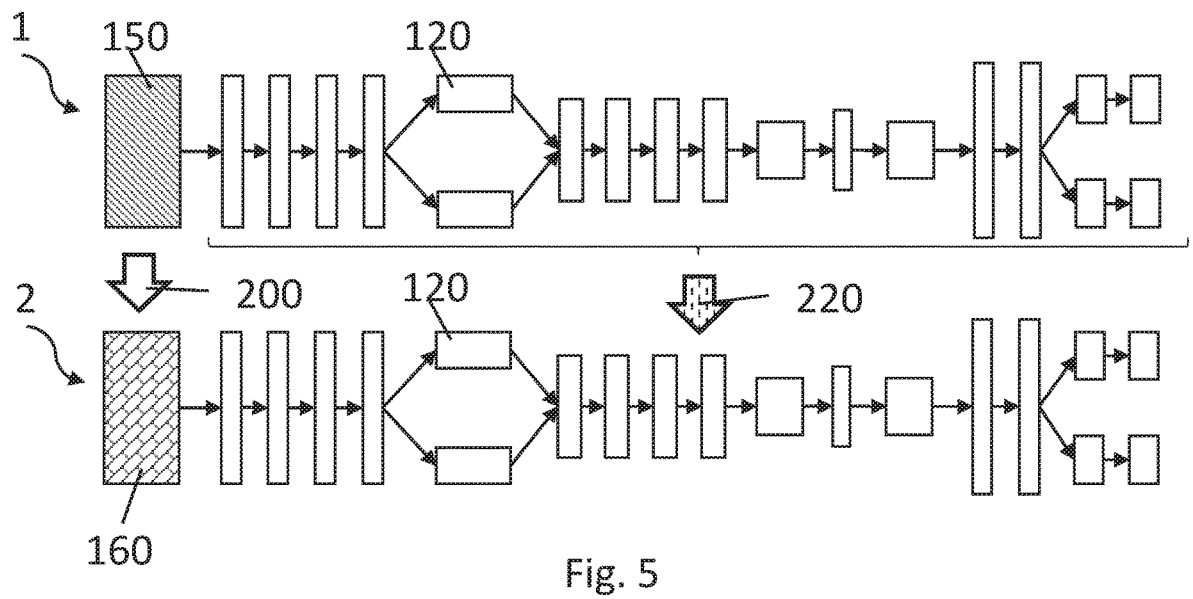
FIG. 5 shows the conversion exclusively of the input layer of the first neural network into a second neural network according to an embodiment of the invention.

FIG. 5 shows a conversion of the input layer 150 exclusively in order to process amended input information. This can be necessary, for example in the event of a camera being switched, since the image acquisition unit and the image pre-processing stage can be amended such that, for example, YUV images instead of RGB images are made available to the input layer 150 of a neural network. However, in the method presented in FIG. 5, the input layer 150 is exclusively converted and the remaining layers 120 of the first neural network 1 can be adopted 220 without adjustments. At the start, the conversion 200 and random initialization of the relevant input layer 150 in(to) the second neural network 2 are carried out. In this connection, the remaining structure of the first neural network 1 is retained 220. The input layer 150 is then trained on the basis of a small dataset which is adjusted in accordance with the problem. A process of subsequently training the unaltered architecture is subsequently carried out with the aid of the fine-tuning method. As a result, the second neural network 2 having the converted input layer 160 is available.

Figure 6:
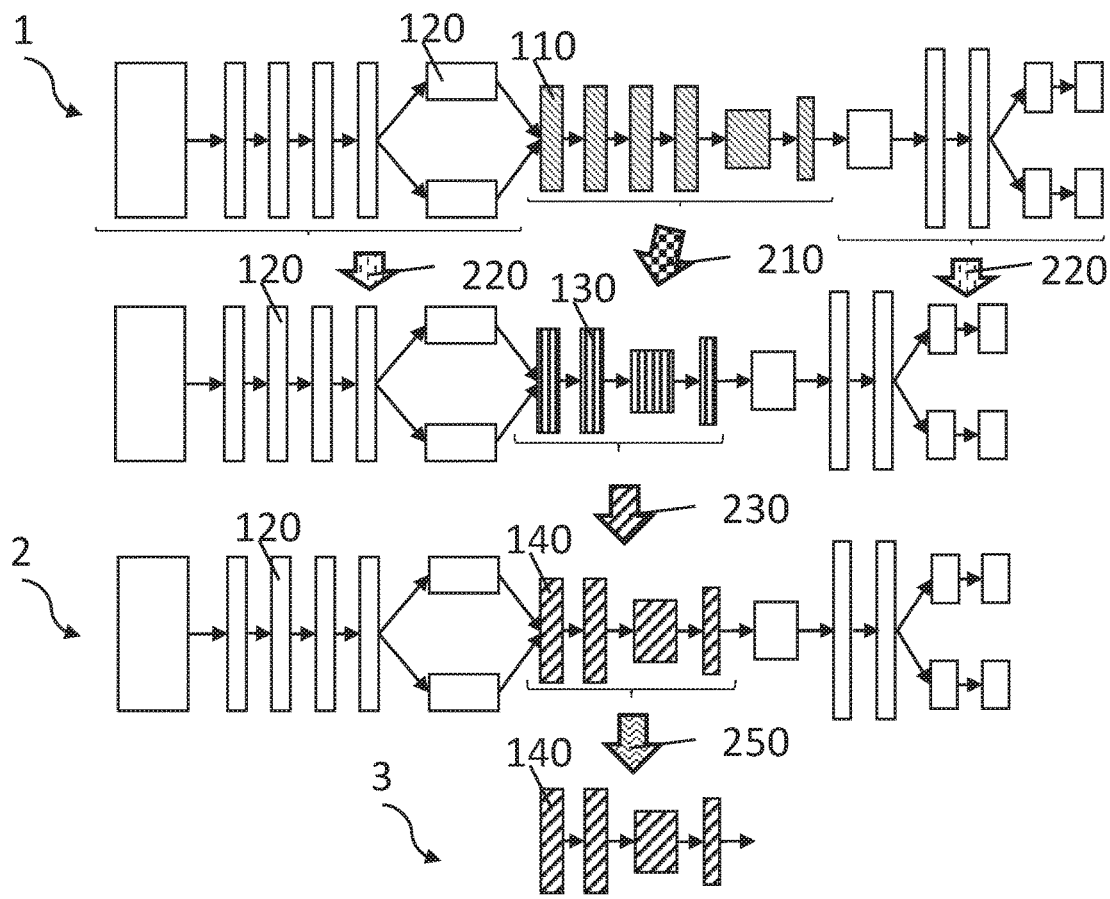
FIG. 6 shows the feature extraction of a part of the second neural network according to an embodiment of the invention.

FIG. 6 shows a further example of the presented method for converting the first neural network 1 into the second neural network 2. FIG. 6 additionally shows the possibility of extracting a subnetwork 3, also referred to as an offspring network, from the second neural network 2 and of utilizing it for other purposes such as use on another controller. The smaller subnetwork 3 can be trained within the second neural network 2. The trained subnetwork 3 can, however, be applied as an independent neural network in any application and can be further improved with the aid of the fine-tuning method. The subnetwork 6 obtained can be particularly deployed to extract features.

Figure 7:
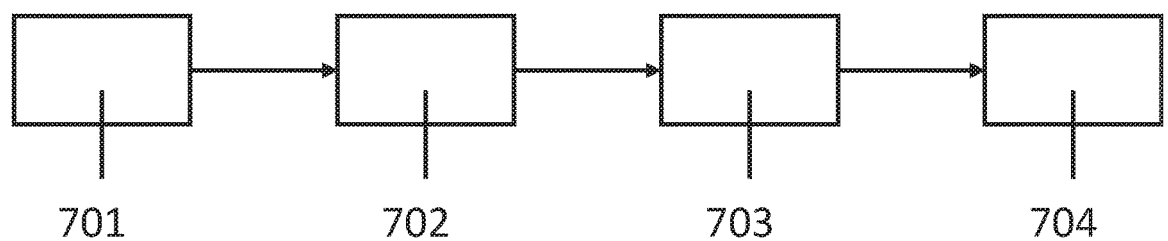
FIG. 7 shows a flow diagram for the method according to the invention.

FIG. 7 shows a flow diagram for the method according to this invention. In step 701, the conversion of at least one layer of the first neural network into at least one layer of the second neural network is carried out. This is followed by step 702 with the random initialization of the at least one converted layer. In step 703, the converted layer is trained in the second neural network. Finally, in step 704, the non-converted layer, that is to say the layer adopted from the first neural network, is adapted to the second neural network with the aid of the fine-tuning.

Figure 8:
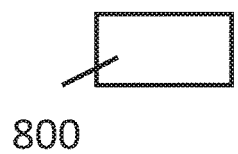
FIG. 8 shows a controller which performs the method according to the invention.

FIG. 8 shows a controller 800 on which the described method is executed. The controller 800 can be part of a driver assistance system.

Figure 9:
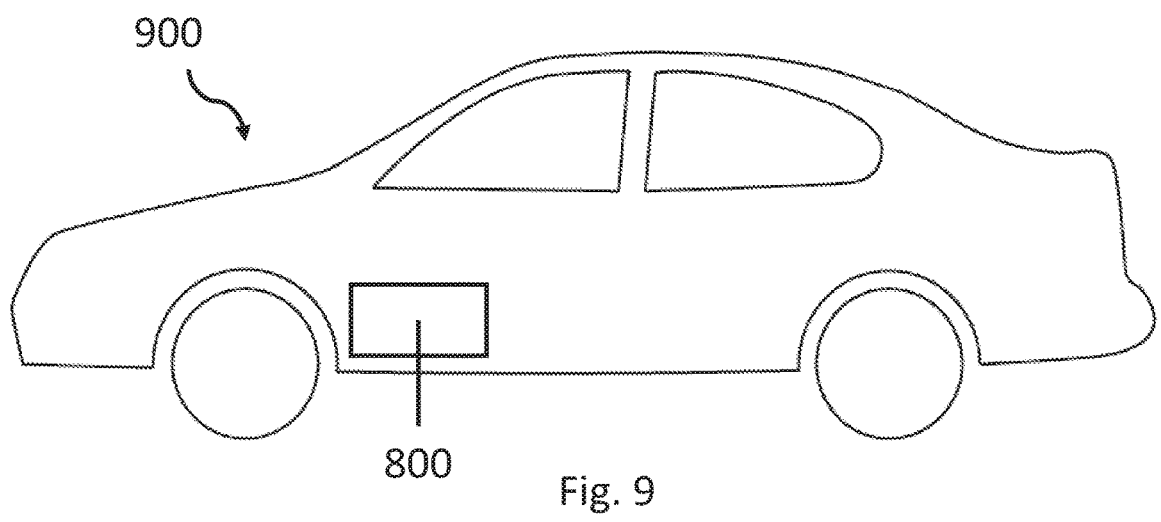
FIG. 9 shows a vehicle having a controller according to an embodiment of the invention.

FIG. 9 shows a vehicle 900 having the controller 800 which performs the method according to the invention.

LIST OF REFERENCE NUMERALS

110 Layer to be converted of the first neural network
120 Layer which is transferred without changes into the second neural network
130 Randomly initialized layer
140 Layer trained in the second neural network
150 Input layer to be converted of the first neural network
160 Input layer to be converted of the second neural network
200 Conversion of the first neural network into the second neural network
210 Conversion into the second neural network and random initialization
220 Adoption of the layers without changes in the second neural network
230 Training of the converted layer in the second neural network
240 Fine-tuning of the adopted layer in the second neural network
250 Conversion of the input layer for the second neural network
701 Conversion step of at least one layer into the second neural network
702 Random initialization step of the converted layer
703 Training step of the converted layer in the second neural network
704 Fine-tuning step of the adopted layer in the second neural network
800 Controller for the converting method
900 Vehicle having the controller

The invention claimed is:

1. A method for converting a first neural network with a first architecture into a second neural network with a second architecture for use in a vehicle controller in order to obtain the knowledge of the first neural network and transfer same to the second neural network, the method having the following steps:
Conversion of at least one layer of the first neural network into at least one layer of the second neural network;
Random initialization of the at least one converted layer in the architecture of the second neural network, wherein the random initialization of the at least one converted layer comprises assigning random values to weights and filters of the at least one converted layer;
Training the randomly initialized at least one converted layer and the random values assigned to the weights and filters of the at least one converted layer in the second neural network;
Simultaneously fine-tuning of a non-converted layer in the second neural network or of the entire second neural network with the training of the randomly initialized at least one converted layer in the second neural network,
wherein the conversion of at least one layer of the first neural network into the second neural network is carried out in multiple cycles, wherein for each cycle, the conversion of at least one layer of the first neural network into the second neural network, the random initialization, and the simultaneous training and fine-tuning steps are carried out.

2. The method according to claim 1, wherein the first architecture of the first neural network is different to the second architecture of the second neural network.

3. The method according to claim 1, additionally having the following step:
Transfer of at least one layer of the first neural network without changes into the second neural network.

4. The method according to claim 1, wherein the conversion step comprises the conversion of at least two layers of the first neural network into one layer of the second neural network.

5. The method according to claim 1, wherein the conversion step comprises the conversion of one layer of the first neural network into at least two layers of the second neural network.

6. The method according to claim 1, wherein the conversion step exclusively comprises the conversion of an input layer of the first neural network into the second neural network, wherein the method provides that the remaining layers of the first neural network are transferred without changes into the second neural network.

7. The method according to claim 1, wherein the method provides that the second architecture of the second neural network is to be optimized or respectively to be compressed for hardware running said neural network.

8. The method according to claim 1, additionally having the following steps:
Extraction of a subnetwork from the first neural network;
Random initialization of the subnetwork in the architecture of the second neural network;
Training of the subnetwork in the architecture of the second neural network;
Utilization of the subnetwork as an independent neural network.

9. A program element stored on a non-transitory computer-readable medium, wherein the program element is configured to be executed by a hardware vehicle controller of a driver assistance system and to instruct the hardware vehicle controller to perform the method according to claim 1.

10. A hardware vehicle controller for converting a first neural network into a second neural network, the hardware vehicle controller having:
the first neural network with a first hardware architecture;
the second neural network with a second hardware architecture;
wherein the first hardware architecture and the second hardware architecture are different,
wherein the first neural network and the second neural network have at least one layer,
wherein the hardware vehicle controller is configured to convert the first neural network into the second neural network in multiple cycles,
wherein the hardware vehicle controller is embodied to convert at least one layer of the first neural network into at least one layer of the second neural network in each cycle,
wherein the hardware vehicle controller is embodied to randomly initialize the at least one converted layer in the second neural network, wherein the random initialization of the at least one converted layer comprises assigning random values to weights and filters of the at least one converted layer,
wherein the hardware vehicle controller is embodied to train the randomly initialized at least one converted layer and the random values assigned to weights and filters of the at least one converted layer in the second neural network, and
wherein the hardware vehicle controller is embodied to simultaneously fine-tune a non-converted layer or the entire second neural network in each cycle with the training of the randomly initialized at least one converted layer.

11. The hardware vehicle controller according to claim 10, wherein the hardware vehicle controller is designed to process input data by means of the second neural network.

12. The hardware vehicle controller according to claim 10, wherein the hardware vehicle controller is embodied to convert the first neural network of a first vehicle system into the second neural network of a second vehicle system.

13. A vehicle having a hardware vehicle controller according to claim 10.

* * * * *